US009676490B2

(12) United States Patent
Vallart et al.

(10) Patent No.: US 9,676,490 B2
(45) Date of Patent: *Jun. 13, 2017

(54) ASSISTING THE PILOTING OF A MULTI-ENGINED ROTORCRAFT IN AN ENGINE-FAILURE SITUATION, IN THE CONTEXT OF A MAIN ROTOR OF THE ROTORCRAFT BEING DRIVEN AT VARIABLE SPEED

(71) Applicant: AIRBUS HELICOPTERS, Marignane (FR)

(72) Inventors: Jean-Baptiste Vallart, Aix en Provence (FR); Setareh Taheri, Aix en Provence (FR); Damien Gavios, Marseilles (FR); Celine Rocheron, Salon de Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,530

(22) Filed: Nov. 23, 2015

(65) Prior Publication Data
US 2016/0144971 A1  May 26, 2016

(30) Foreign Application Priority Data
Nov. 26, 2014  (FR) ...................... 14 02671

(51) Int. Cl.
*G01C 23/00* (2006.01)
*B64D 31/06* (2006.01)
*F02C 9/42* (2006.01)

(52) U.S. Cl.
CPC ................ *B64D 31/06* (2013.01); *F02C 9/42* (2013.01); *F05D 2220/329* (2013.01); *F05D 2270/093* (2013.01)

(58) Field of Classification Search
CPC .......... B64D 31/06; B64C 27/12; B64C 27/57
(Continued)

(56) References Cited

U.S. PATENT DOCUMENTS 3,174,284 A   3/1965  McCarthy
4,831,567 A   5/1989  Lea
(Continued)

FOREIGN PATENT DOCUMENTS

CA   2452212   6/2005
EP   2724939   4/2014
(Continued)

OTHER PUBLICATIONS

French Search Report for French Application No. FR 1402671, Completed by the French Patent Office on Aug. 6, 2015, 4 Pages.
(Continued)

*Primary Examiner* — Gertrude Arthur Jeanglaude
(74) *Attorney, Agent, or Firm* — Brooks Kushman P.C.

(57) ABSTRACT

A method of assisting the piloting of a multi-engined rotorcraft in the event of an engine failure. A main rotor of the rotorcraft is driven at a variable NR speed under the control of a control unit. Calculation means identify an authorized margin of mechanical power usable by the pilot depending on a rating for regulating the operation of each of the engines under the control of a regulator unit. Outside an engine-failure situation, and providing the main rotor is being driven at a low NR speed, the mechanical power margin that is usable by the pilot and that is displayed on a screen, is in fact a limited margin of a value less than the authorized margin. Under such conditions, and in an engine-failure situation, the mechanical power reserve that is actually available enables the pilot to counter rapidly the sudden drop in the NR speed of rotation of the main rotor as induced by the engine failure.

13 Claims, 2 Drawing Sheets

(58) Field of Classification Search
USPC .................... 701/3, 4, 13, 14, 15, 29.1, 29.2
See application file for complete search history.

(56) References Cited

U.S. PATENT DOCUMENTS

| | | | | |
|---|---|---|---|---|
| 5,799,901 | A * | 9/1998 | Osder | ............... B64C 27/24 244/17.13 |
| 6,198,991 | B1 | 3/2001 | Yamakawa et al. | |
| 6,885,917 | B2 * | 4/2005 | Osder | ............... B64C 27/18 244/10 |
| 7,756,612 | B2 | 7/2010 | Salesse-Lavergne | |
| 7,931,231 | B2 | 4/2011 | Cherepinsky et al. | |
| 9,008,942 | B2 | 4/2015 | Dyrla et al. | |
| 9,193,453 | B2 * | 11/2015 | Vallart | ............... B64C 27/12 |
| 9,463,874 | B2 | 10/2016 | Vallart et al. | |
| 2005/0135930 | A1 | 6/2005 | Certain | |
| 2007/0118254 | A1 | 5/2007 | Barnes et al. | |
| 2012/0253560 | A1 * | 10/2012 | Corpron | ............... B64D 35/04 701/3 |
| 2013/0221153 | A1 | 8/2013 | Worsham, II et al. | |
| 2014/0302461 | A1 | 10/2014 | Dumur et al. | |
| 2014/0303871 | A1 | 10/2014 | Presse | |

FOREIGN PATENT DOCUMENTS

| | | |
|---|---|---|
| FR | 2900385 | 11/2007 |
| FR | 2983319 | 5/2013 |
| FR | 3004164 | 10/2014 |
| GB | 2192163 | 1/1988 |
| WO | 2010143051 | 12/2010 |

OTHER PUBLICATIONS

Schaefer et al. 47th Forum American Helicopter Society 1991, pp. 1293-1303, "Enhanced energy maneuverability for attack helicopters using continuous variable (C-V) rotor speed control".

* cited by examiner

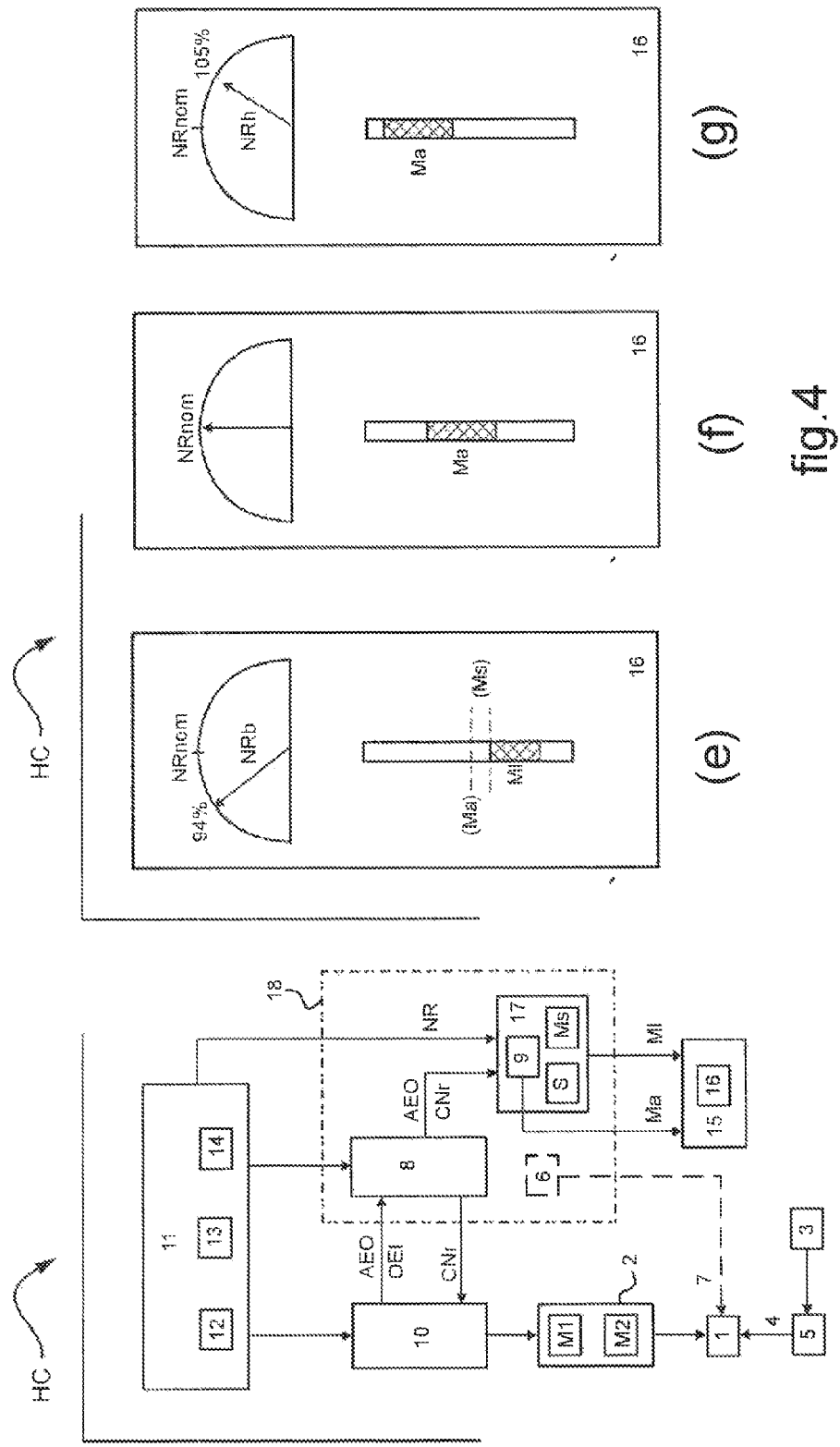

ASSISTING THE PILOTING OF A MULTI-ENGINED ROTORCRAFT IN AN ENGINE-FAILURE SITUATION, IN THE CONTEXT OF A MAIN ROTOR OF THE ROTORCRAFT BEING DRIVEN AT VARIABLE SPEED

CROSS REFERENCE TO RELATED APPLICATION

This application claims priority to French patent application No. FR 14 02671 filed on Nov. 26, 2014, the disclosure of which is incorporated in its entirety by reference herein.

BACKGROUND OF THE INVENTION (1) Field of the Invention

The present invention relates to the field of regulating the operation of each of the engines in a power plant of a multi-engined rotorcraft. Said power plant comprises in particular fuel-burning main engines, in particular turboshaft engines, that conventionally deliver to the rotorcraft the mechanical power needed at least for driving one or more of the rotors of the rotorcraft.

The present invention lies more specifically in the context of a failure of at least one of said main engines of the rotorcraft that drive rotation of at least one main rotor of the rotorcraft at a variable setpoint speed.

(2) Description of Related Art

The main rotor of a rotorcraft typically provides the rotorcraft at least with lift, and possibly also in the specific example of a helicopter, with propulsion and/or the ability to change attitude in flight. An anti-torque rotor of the rotorcraft typically serves to stabilize and guide the rotorcraft in yaw and is commonly formed by a tail rotor or by at least one propulsive propeller in a rotorcraft having high forward speeds.

Conventionally, the operation of each of the main engines of a rotorcraft is placed under the control of a full authority digital engine control (FADEC). The FADEC controls the metering of fuel to the main engines as a function of the mechanical power requirements of the rotorcraft, and in particular as a function of the mechanical power requirements for driving the main rotor at a required speed of rotation as identified by a speed setpoint, referred to as the NR setpoint.

The mechanical power needs of a rotorcraft are potentially identified by a flight control unit, such as an automatic flight control system (AFCS). For example, the mechanical power needed by the main rotor may be identified by the on-board instrumentation of the rotorcraft on the basis of a resistive torque that the main rotor opposes against being driven by the power plant.

In this context, the current operating rating of the power plant is controlled by the regulator unit depending on various regulation ratings that are identified as a function of a nominal regulating rating commonly referred to as the all engines operative (AEO) rating.

The regulation of the operating rating of the power plant serves to avoid damaging one or more main engines as a result of making excessive use of the capacities of the power plant for delivering the mechanical power required by the rotorcraft. Several limit criteria are taken into account by the regulator unit in order to avoid such excessive use being made of the capacities of the power plant. Such limit criteria include, by way of example:

a criterion for limiting the speed of the gas generator(s) of the engine(s);

a criterion for limiting the temperature of the free turbine(s) of the engine(s) as driven by the gas generator(s); and a criterion for limiting the torque from the free turbine and/or at the inlet of a main mechanical power transmission gearbox, which gearbox has at least the rotor(s) engaged therewith in order to be driven in rotation.

In addition to the AEO rating, various specific operating ratings for the power plant are commonly defined as a function of stages of flight of the rotorcraft. These specific regulation ratings of the AEO rating include in particular:

a maximum continuous power (MCP) rating defining the maximum rating that is authorized for continuous use of the engine(s) depending on the constraints imposed by said limit criteria. Such an MCP rating is commonly used while the rotorcraft is in cruising flight;

a maximum takeoff power (TOP) rating defining the maximum rating authorized for the engine(s) for use over a predetermined duration, which by way of example is about 30 minutes (min), and which is defined as sufficing for enabling the rotorcraft to take off. Such a maximum TOP rating is also commonly used while a rotorcraft is hovering;

a maximum transient power (MTP) rating defining the maximum rating that is authorized for the engine(s) for use during a transient stage of changing the forward speed of the rotorcraft, in particular while the rotorcraft is accelerating. The MTP rating is used for a short duration, and by way of example it may be of the order of about ten seconds or one minute.

In this context, there arises the problem of a failure of one of the main engines of a twin-engined rotorcraft or of a plurality of the main engines of a rotorcraft having more than two main engines. Under such circumstances, it can happen that only one main engine of the rotorcraft remains operational and needs, on its own, to deliver all of the mechanical power required by the rotorcraft.

That is why specific ratings have been developed for regulating the operation of main engines in the event of a main engine failing, and they are commonly referred to as one engine inoperative (OEI) ratings.

OEI ratings are applied to regulate the operation of a main engine that is delivering on its own the mechanical power needed by the rotorcraft in flight in the event of at least one other main engine of a multi-engined rotorcraft failing. OEI ratings are typically defined for specific stages of flight in compliance with a given level of mechanical power to be delivered for a given period by the main engine while ensuring that the engine is not degraded beyond an acceptable degradation threshold. Various OEI ratings may potentially be applied by the regulator unit, either automatically (by an automatic controller) or on request of the pilot of the rotorcraft in compliance with the flight manual. The following OEI ratings are commonly defined:

a very short duration OEI rating in which each still-operational main engine(s) can individually be used at a contingency rating for a short duration of the order of 30 seconds (s);

a short duration OEI rating in which each still-operational main engine is individually usable at a contingency rating for a short duration of the order of 2 min to 3 min;

a long duration OEI rating during which each still-operational main engine is individually suitable for being used a defined maximum contingency rating for a duration that is long, and potentially unlimited.

Furthermore, a rotorcraft is conventionally fitted with at least one display unit for the purpose of using a screen to give the pilot information about the flight state of the rotorcraft and in particular information about the operating state of each engine.

Such a display unit may for example be of the type commonly known as a flight limit indicator (FLI).

On the basis of data about the operating state of each main engine, and taking account in particular at least of said limit criteria and of the current regulation rating of each main engine, a screen displays mechanical power margin information, referred to below as the "authorized" margin, that can be made use of by the pilot without damaging the power plant. The pilot then generates flight controls while ensuring that the power plant is not called on to deliver mechanical power exceeding said authorized margin.

Concerning the NR setpoint, it is defined so as to obtain a speed of rotation for the main rotor, referred to below as the NR speed, and that is conventionally predefined as being substantially constant.

In that traditional context, the NR speed varies at most over a narrow range of speed variation of the order of 5% of a nominal speed, while nevertheless not exceeding a rate of variation of about 1% per second. The impact of such limited variation of the NR speed is negligible for the variation in the mechanical power than the main engines of the rotorcraft need to deliver in order to drive the main rotor.

Specifically, a failure of one of the main engines of the rotorcraft leads to a sudden loss of mechanical power that can be delivered by the power plant. As a result of such a sudden loss of mechanical power, the NR speed drops. Nevertheless, at the instant of one of the main engines of the rotorcraft failing, the current NR speed is substantially equal to the nominal speed and is still sufficient to enable the pilot to have easy control over the attitude of the rotorcraft.

Furthermore, depending on the equipment of the rotorcraft, an autopilot may potentially be used to act quickly to re-establish safe flight conditions for the rotorcraft in the event of one of the main engines failing, with the autopilot generating automatic flight control signals that serve in particular to modify the current collective pitch of the blades of the main rotor in order to ensure stabilized lift of the rotorcraft.

In general terms, such an autopilot that may potentially be fitted to a rotorcraft is a member for automatically assisting in piloting that typically generates automatic flight control signals for causing collective and/or cyclic variation in the pitch of the blades of the main rotor, and possibly also collective variation in the pitch of the blades of said at least one auxiliary rotor, e.g. a tail rotor.

Conventionally, the automatic flight control signals are generated by the autopilot in application of flight setpoints previously sent to the autopilot by the human pilot of the rotorcraft by means of various human-actuatable control members, such as in particular manual flight control members.

When the autopilot is on, the flight setpoints are processed by the autopilot in order to generate automatic flight control signals in compliance with applying various predefined modes of operation of the autopilot that are implemented on being selected by the human pilot.

Such modes of operation of the autopilot include in particular at least a basic mode providing automatic assistance for stabilizing the rotorcraft in flight, and/or higher modes of operation that provide automatic guidance of the rotorcraft.

In this context, the autopilot applies a given operating mode in compliance with the available mechanical power that can be delivered by the power plant depending on its operating state as identified by said limit criteria and depending on the current regulation rating being applied by the regulator unit.

Naturally, in this context, the autopilot has available information that is delivered by the on-board instrumentation about the operating state of the power plant as identified by the limit criteria. The autopilot generates automatic flight control signals while taking account of said authorized margin, including in the event of at least one of the main engines failing, in order to avoid degrading the main engines.

Nevertheless, technical trends in the field of rotorcraft are favoring driving the main rotor at a controlled NR speed that is variable relative to the nominal speed, depending on the flight conditions of the rotorcraft. Such significant variation in the NR speed at which the main rotor is driven in rotation can be used, by way of example, for the purpose of reducing the sound nuisance of the rotorcraft and/or for improving its performance during certain stages of flight, or indeed for adapting the NR speed as a function of weather conditions and/or as a function of the situation in which the rotorcraft is placed.

By way of indication, in this context of recent techniques involving controlling variation in the NR speed, the speed of the rotor speed may be controlled to vary in the range 5% to 20% of the nominal speed, and possibly even more, with changing techniques. By way of indication, the NR speed is presently commonly controlled to vary over a range of values that may lie potentially from 90% to 107% of the nominal speed.

In this context, reference may be made to Document XP0000 Schaefer 1990 "Enhanced energy maneuverability for attack helicopters using continuous variable rotor speed control" (C. G. Schaefer Jr.; F. H. Lutze Jr.); 47th Forum American Helicopter Society 1991; pp. 1293-1303. According to that document, the performance of a rotorcraft in a combat situation is improved by varying the speed at which the main rotor is driven in rotation depending on variation in the air speed of the rotorcraft.

Reference may also be made by way of example to Document U.S. Pat. No. 6,198,991, which proposes reducing the sound nuisance generated by a rotorcraft close to a landing point by varying the speed of rotation of the main rotor.

In this context, reference may also be made by way of example to Document US 2007/118254, which proposes varying the speed of rotation of the main rotor of a rotorcraft between two values referred to as "high" and "low", under predefined threshold conditions for the values of various parameters associated with previously identified flight conditions of the rotorcraft.

Also by way of example, reference may also be made on this topic to Document WO 2010/143051, which proposes varying the speed of rotation of a main rotor of a rotorcraft in compliance with a previously established map depending on various flight conditions of the rotorcraft.

There then arises the problem of ways of acting on the behavior of the rotorcraft in the event of a failure of one of its main engines, given that the main rotor may potentially be being driven at an NR speed that is low compared with its nominal speed, which speed may be at least 7% less than the nominal speed. Under such circumstances, it is much more difficult for the pilot to bring the drive of the main rotor back to an NR speed that is in compliance with the NR setpoint.

Consequently, it appears to be appropriate to provide the pilot of a multi-engined rotorcraft with assistance in piloting in order to act, in the event of one of the main engines failing, for the purpose of bringing the drive of the main rotor back quickly to an NR speed that ensures safe progress for the rotorcraft in the context of it being possible that the main rotor was being driven at an NR speed that is low compared with the nominal speed at the instant when said one of the main engines fails.

The technological background of the invention includes the situation of a single-engined rotorcraft where automatic assistance is provided for the pilot of the rotorcraft in order to place the main rotor in autorotation in the event of the main engine failing.

Such assistance is provided by an automatic device that acts in the event of the main engine failing to generate flight control signals for the purpose of modifying the attitude of the rotorcraft in vertical, pitching, roll, and/or yaw terms, in order to counterbalance the unfavorable aerodynamic effects that occur immediately after a failure of the main engine.

Reference may be made for example on this topic to the following documents: GB 2 192 163; US 2005/135930; and US 2013/0221153.

BRIEF SUMMARY OF THE INVENTION

In this context, the present invention provides a method of assisting the piloting of a multi-engined rotorcraft in the event of a failure of one of the main engines of a power plant of the rotorcraft, referred to below as an engine-failure situation. It should be recalled that said power plant delivers the mechanical power needed at least for driving rotation of at least one main rotor of the rotorcraft, which rotor provides the rotorcraft at least with the essential function of lift.

The method of the present invention lies more specifically in the context of the difficulties that are encountered when, outside an engine-failure situation, the main rotor is driven at a variable controlled NR speed.

Such variable NR speed control is used in particular by a flight control unit of the rotorcraft in order to respond to specific needs, such as for example reducing sound nuisance generated by the rotorcraft during a stage of approaching a landing point.

In such a context, it should be recalled that the value of an NR setpoint generated by said flight control unit may potentially vary over a range of values proportional to the value of a predefined nominal speed for driving the main rotor, and by way of indication with present techniques, this speed may lie in the range 90% to 107% of the value of said nominal speed.

By applying such a method, the present invention seeks more particularly to give the pilot of the rotorcraft the ability to re-establish stabilized progress of the rotorcraft quickly and easily in the event of an engine failure, in particular when said engine failure occurs while the main rotor is being driven by a speed that is potentially significantly low relative to said nominal speed.

The method in accordance with the present invention thus lies in the context in which the main rotor, outside an engine-failure situation, is driven by the power plant in compliance with applying a speed setpoint, referred to as the NR setpoint. The value of the NR setpoint is variable and is calculated by a flight control unit depending on the current flight conditions of the rotorcraft so as to lie in a range of NR setpoint values that are proportional to the value of a predefined nominal speed for driving the main rotor.

In this context, the flight control unit supplies said NR setpoint to a regulator unit for regulating the individual operation of each of the main engines for driving the main rotor at a speed, referred to as the NR speed, in compliance with applying the NR setpoint.

Furthermore, the regulator unit applies various regulation ratings to the individual operation of each of the main engines depending on the current flight state of the rotorcraft.

While in a current flight state of the rotorcraft that is outside an engine-failure situation, the regulator unit applies first regulation ratings referred to as AEO ratings. Typically, AEO ratings define a maximum authorized rating for each of the main engines for respective predefined durations at each of the AEO ratings.

In a current flight state of the rotorcraft that is an engine-failure situation, the regulator unit applies second regulation ratings, referred to as OEI ratings. Typically, OEI ratings define a contingency rating authorized for at least one of the main engines remaining operational for respective predefined durations corresponding to each of the OEI ratings.

Furthermore, the rotorcraft is fitted with a unit, referred to as a display unit, using a display screen for displaying at least one value relating to the mechanical power margin that is authorized for use by the pilot, referred to as the authorized margin.

As mentioned above, the authorized margin is conventionally deduced by calculation means depending on at least the current regulation rating of the main engines while taking account at least of limit criteria identifying the operating states of the main engines.

According to the present invention, such a method of assisting the piloting of a multi-engined rotorcraft is mainly recognizable in that, outside an engine-failure situation, the value displayed by the screen relating to the authorized margin, then referred to as the limited margin, is the value of the authorized margin after a predefined value, referred to as the safety margin, has been subtracted therefrom by the computer.

Said subtraction is performed by the computer on condition at least of the main rotor being driven at an NR speed, referred to as "low" speed, under the control of the flight control unit and identified as being below a predefined speed threshold for driving the main rotor, referred to as the NR speed threshold.

According to the method of the present invention, in an engine-failure situation and in the event that, prior to the engine-failure situation, the rotorcraft was operating with the main rotor being driven at NR speed below the NR speed threshold, the pilot of the rotorcraft has a mechanical power reserve making it easier for the pilot to take action on the behavior of the rotorcraft in order to re-establish control quickly over its progress, while avoiding any significant drop in the number of revolutions per second in the rotation of the main rotor.

Specifically, outside an engine-failure situation and on condition at least of the rotorcraft operating at with the main rotor being driven at an NR speed that is less than the NR speed threshold, the pilot of the rotorcraft controls the mechanical power consumed by the rotorcraft in compliance with the limited margin value.

Given that the value of the limited margin is less than the value of the authorized margin, a possible deficit in mechanical power delivered by the power plant in an engine-failure situation is remedied by making available to the pilot of the rotorcraft said mechanical power reserve resulting from the fact that the pilot was controlling the behavior of the rotorcraft before the engine-failure situation in compliance with said limited margin rather than in compliance with said authorized margin, as is usual outside the invention.

It can be seen that in an engine-failure situation, said mechanical power reserve can be used to limit quickly a sudden drop in the number of revolutions per second of the main rotor as a result of the engine failure.

More particularly, it is usual outside an engine-failure situation for the pilot to make optimum use of the performance of the rotorcraft, and in particular to optimize the capacity of the power plant for optimizing the lift delivered by the main rotor and/or the propulsion performance of the rotorcraft.

Naturally, making optimum use of the capacities of the power plant outside an engine-failure situation complies with the limits imposed by regulation using the current AEO rating, and in particular the MCP rating as defined above for continuous optimum use of the capacities of the power plant.

In this conventional context of an engine-failure situation, the available mechanical power delivered by the power plant drops suddenly during a period of a few seconds required for the still-operational main engine(s) to rise in power.

The pilot then causes the collective pitch of the blades of the main rotor to vary in order to achieve a favorable flight situation in application of regulation using the current OEI rating of the still-operational main engine. Nevertheless, in such a context, the NR speed of the main rotor drops rapidly throughout said period of a few seconds, thereby causing the rotorcraft lose height.

Said mechanical power reserve made available by the provisions of the present invention makes it possible to reduce the difference between the minimum mechanical power that might be being delivered by the power plant prior to the engine-failure situation and the maximum mechanical power that is delivered by the power plant in an engine-failure situation following the rise in power of the still-operational main engine(s), now operating with regulation in compliance with applying the OEI rating under the control of the regulator unit. Such a mechanical power reserve makes it possible in particular to limit the drop in the number of revolutions per minute of the main rotor, and thus to limit the minimum NR speed that is reached in the rotary drive of the main rotor in an engine-failure situation.

It should be observed that the value of the safety margin is identified in particular depending on the current flight situation of the rotorcraft, such as, and as described in greater detail below by way of example, a situation in which the rotorcraft is in a transient acceleration stage, outside an engine-failure situation, during which the operation of the main engines is regulated in application of an AEO rating, specifically in an MCP mode defining a maximum continuous authorized power for the main engines.

Finally, the provisions of the present invention mean that progress of the rotorcraft is made safe in the event of an engine-failure situation occurring while the NR speed at which the main rotor is being driven is low compared with the nominal speed. Such safe progress of the rotorcraft is made available to the pilot of the rotorcraft regardless of whether that pilot is a human pilot or an autopilot with which the rotorcraft might be provided. For a human pilot, said safety in the progress of the rotorcraft also makes piloting easier for the pilot while re-establishing safe progress of the rotorcraft.

In order to deduce the limited margin, the computer may act in known manner to deduce the authorized margin by making use of:

first information supplied by the flight control unit and identifying the mechanical power being consumed by the rotorcraft;

second information supplied by the on-board instrumentation of the rotorcraft and identifying the operating state of the power plant on the basis of respective values for limit criteria; and third information supplied by the regulator unit and relating to the current rating with which the main engines of the power plant are being regulated.

In this context, the computer may potentially be incorporated in any calculation member of the rotorcraft that has available at least the first information, the second information, and the third information. Such a calculation member may for example be constituted in particular by the flight control unit, or indeed by the regulator unit, or by the display unit.

In preferred implementations the method of the invention, said reduction of the authorized margin by the safety margin, as performed outside an engine-failure situation by the computer prior to displaying the value of the limited margin on the screen, is conditional on the main engines being regulated in an AEO rating, and specifically in an MCP mode defining a maximum authorized continuous rating for the main engines.

When the rotorcraft is climbing close to the ground, or when it is in a state of cruising flight, the pilot commonly causes the rotorcraft to progress while regulating the main engines at an MCP rating in order to have continuously available the optimum level of mechanical power delivered by the power plant.

More particularly, during a stage in which the rotorcraft is climbing close to the ground, the NR speed at which the main rotor is driven may potentially be caused to be low by the flight control unit, in particular in order to reduce sound nuisance.

While the rotorcraft is flying under such conditions, the resisting torque opposed by the main rotor against being driven by the power plant is large, as a result of the collective pitch of the main rotor being set to deliver the lift required by the rotorcraft when flying with a low NR speed.

That is why, in such a context, the pilot desires to make best use of the mechanical power that can be delivered by the power plant by regulating the main engines at the MCP rating.

Still more particularly in cruising flight, the rotorcraft progresses at a high forward speed at which the performance of the rotorcraft is more important than the sound nuisance it produces. Consequently, during such a cruising stage of flight of the rotorcraft, the pilot seeks to have available the optimum mechanical power that can be delivered by the power plant while regulating the main engines at the MCP rating so as to enable the rotorcraft to be propelled at high forward speed.

In a general approach for implementing the method of the present invention, the value of said NR speed threshold corresponds in particular at most to a little less than the value of said predefined nominal speed for driving the main rotor.

It is more specifically preferred for the value of said NR speed threshold to correspond at most to the value of said predefined nominal speed for driving the main rotor minus a value lying in the range 2% to 5% of said nominal speed.

More particularly, in the present state of the art, the value of said NR speed threshold preferably corresponds to 97% of said nominal speed.

Furthermore, the value of said safety margin is preferably predefined proportionally to the power imposed by the current AEO rating. More particularly, in the present state of the art, the value of said safety margin is potentially predefined in proportion to the mechanical power limit authorized by the current AEO rating, the proportion lying in the range 8% to 25%.

In addition, the value of said safety margin is potentially predefined to be variable as a function of the current NR speed. More particularly, the calculation of the value for the safety margin as performed by the computer, which is preferably proportional to the mechanical power limit authorized by the current AEO rating, may also incorporate a weighting coefficient of value that varies as a function of the NR speed at which the main rotor is being driven in rotation.

In other words, in a preferred implementation of the method of the present invention, the value of the safety margin is advantageously calculated firstly to be proportional to the mechanical power limit authorized by the current AEO rating, and secondly while also being weighted as a function of the current NR speed at which the main rotor is being driven.

It stems from these provisions that the calculated value for the safety margin is either increased when the current NR speed at which the main rotor is being driven in rotation is particularly low, or conversely is decreased when the current NR speed at which the main rotor is being driven is particularly high, while nevertheless being less than the value of said NR speed threshold.

It should be observed that in the context in which the NR speed at which the main rotor is driven conventionally depends on the NR setpoint generated by the flight control unit, the NR speed at which the main rotor is to be driven prior to the engine-failure situation may itself be determined in conventional manner equally well by one or both of the following in isolation or in combination:

by calculation means on the basis of measurements performed by the on-board instrumentation identifying the value(s) of one or more operating parameters specific to mechanical members of the rotorcraft driving the main rotor. Such calculation means make it possible in particular to identify the resisting torque opposed by the main rotor against being driven by the power plant;

from the current value of the NR setpoint generated by the flight control unit, which determines the current NR speed that is imposed by the flight control unit.

Outside an engine-failure situation, it should be observed that it is appropriate to servo-control the position of a humanly-operable flight control member that can be operated by a human pilot for the purpose of varying the pitch of the blades of the main rotor. Such a manual flight control member is dedicated in particular to varying the collective pitch of the blades of the main rotor, but it could also be a manual flight control member dedicated to varying the cyclic pitch of the blades of the main rotor.

In the context of the invention, such servo-control is then implemented within the mechanical power limit authorized by the current AEO rating, minus said safety margin.

Such a manual flight control member may be constituted by a lever or a joystick controlling a mechanical linkage for transmitting movement to vary the pitch of the blades of the main rotor, or in the known context of electrical flight control it may be constituted by a joystick or a small lever that generates electrical signals that are used by the flight control unit to generate automatic flight control signals causing the pitch of the blades of the main rotor to vary.

More specifically, the method of the present invention comprises the following operations outside an engine-failure situation.

The flight control unit generates the NR setpoint and transmits the generated NR setpoint to the regulator unit. Furthermore, outside an engine-failure situation, the regulator unit applies an AEO rating that depends on the stage of flight of the rotorcraft and it transmits this "current" AEO rating to the computer, i.e. it transmits the AEO rating that is being applied.

Furthermore, the on-board instrumentation of the rotorcraft transmits to the computer the operating states of the main engines as identified by the values of the limit criteria.

In conventional manner, the flight stage of the rotorcraft is identified in particular depending on the information supplied by the on-board instrumentation of the rotorcraft. Such information comprises in particular atmospheric data relating to weather conditions surrounding the rotorcraft, and flight data relating to the flight situation of the rotorcraft and commonly identified depending in particular on the mechanical flight state of the rotorcraft and/or on the height above the ground at which the rotorcraft is flying.

Thereafter, the computer identifies firstly the value of said authorized margin as a result of applying the current AEO rating, and secondly said safety margin. Thereafter, the computer deduces the value of the limited margin and transmits it to the display unit, thereby causing it to be displayed on the screen.

The rotorcraft pilot then generates flight controls so as to fly the rotorcraft within the context imposed by using the mechanical power delivered by the power plant in compliance with the value of the limited margin as deduced by the computer. In this context, the flight controls generated by the pilot are specifically manual flight controls generated by a human pilot on sight of the power margin displayed on the screen. It should nevertheless be understood, where appropriate, and depending on the equipment of the rotorcraft, the flight controls generated by the pilot may equally well be automatic flight control signals as generated automatically by an autopilot, as explained below.

As mentioned above, the position of a human-driven manual flight control member operated by a human pilot to vary the pitch of the blades of the main rotor, in particular collectively, is preferably servo-controlled by the flight control unit in compliance with the value of the limited margin.

In this context, the manual flight control member is also preferably fitted with a generator of haptic signals that vary at least depending on variation in the value of the limited margin.

In addition, for a rotorcraft that has an autopilot, and outside an engine-failure situation, automatic flight controls are generated by the autopilot, when it is in operation, by taking account of the limited margin, and providing the main rotor is being driven at a low NR speed.

BRIEF DESCRIPTION OF THE SEVERAL VIEWS OF THE DRAWINGS

An implementation of the present invention is described below with reference to the figures of the accompanying sheets, in which:

FIG. 3 is a diagram showing ways in which a method in accordance with the present invention can be implemented; and FIG. 4 is made up of a plurality of diagrams (e), (f), and (g), showing ways in which information is displayed on a screen in application of a method in accordance with the present invention, respectively at various NR speeds for driving rotation of a main rotor of a multi-engined rotorcraft.

DETAILED DESCRIPTION OF THE INVENTION

Figure 1:
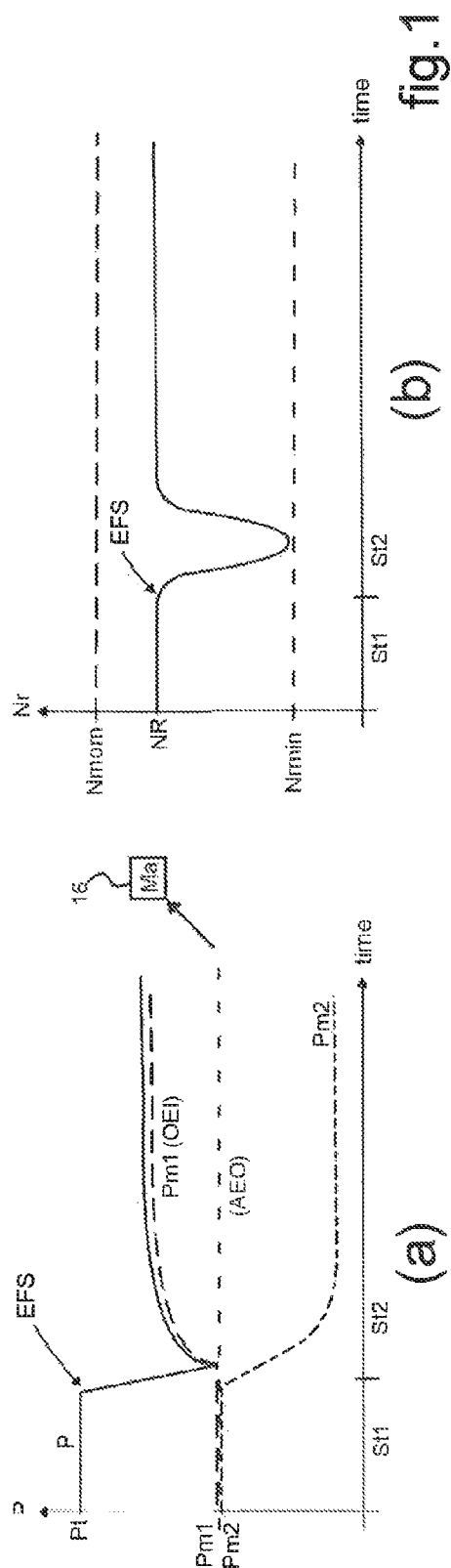
FIG. 1 comprises two diagrams (a) and (b) showing essential events that occur in the prior art as a result of a failure of one of the main engines of a multi-engined rotorcraft, these events being plotted as a function of time.
Figure 2:
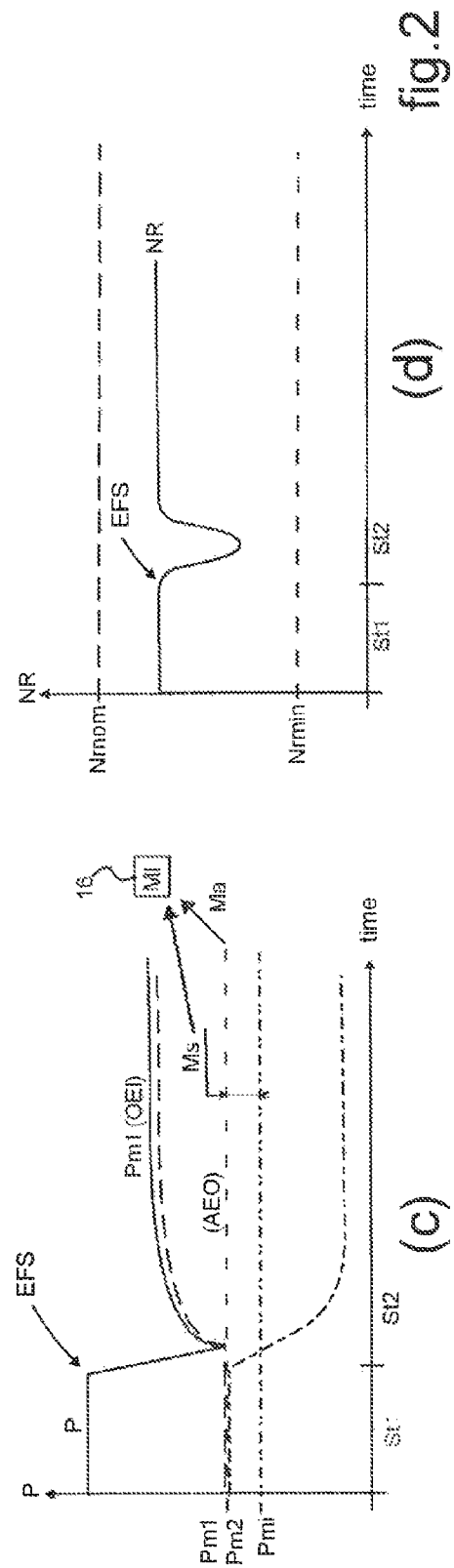
FIG. 2 comprises two diagrams (c) and (d) showing essential events that occur in application of a method in accordance with the present invention as a result of a failure of one of the main engines of a multi-engined rotorcraft, these events being plotted as a function of time.

FIG. 3 shows a multi-engined rotorcraft HC having a power plant 2. In FIGS. 1 and 2, the essential events that occur after failure of one of the main engines of the multi-engined rotorcraft HC are shown, respectively as they occur in the prior art in FIG. 1, and as they occur in application of a method of the present invention, in FIG. 2.

In the implementations shown respectively in FIGS. 1 and 2, the rotorcraft HC is more specifically a twin-engined rotorcraft having a power plant with two main engines.

Nevertheless, it should be understood that the provisions of the present invention are applicable to a rotorcraft having a power plant with at least two main engines.

Such main engines are in particular fuel-burning engines, specifically turboshaft engines, supplying the rotorcraft with the mechanical power needed at least for driving rotation of a main rotor of the rotorcraft in order to obtain at least the essential function of providing the rotorcraft with lift.

The diagram (a) in FIG. 1 and the diagram (c) in FIG. 2 plot, as a function of time (time), variation in the mechanical power (P) supplied by the main engines in the event of one of the main engines failing, referred to as an engine-failure situation EFS. It should be observed that in order to show the invention more clearly, the diagrams (a) and (c) show the same engine-failure situation EFS occurring on rotorcraft having the same propulsion capacities.

In the diagrams (a) and (c), consideration is given to the same situation St1 in which all of the main engines of the rotorcraft are operational. In this situation St1, a first main engine supplies mechanical power Pm1 and a second main engine supplies mechanical power Pm2, the main engines of the rotorcraft both supplying the same mechanical power.

The operation of each of the main engines is conventionally regulated by a regulator unit in application of an AEO rating, such as in particular an MCP rating in which the rotorcraft has available optimum continuous mechanical power.

In compliance with applying the AEO rating, a pilot of the rotorcraft is usually authorized to make use of a predefined mechanical power margin that can be supplied by the power plant, and known as the authorized margin Ma. In conventional manner, a display unit serves to display information on a screen 16 about said authorized margin Ma in order to provide the pilot with assistance in plotting the rotorcraft.

In this context, it should be understood that the relationship between the information displayed by the screen 16 and said authorized margin Ma does not imply that the respective values of the information displayed on the screen and of the authorized margin Ma are exactly the same, but rather that there is a dependency relationship between these values. As explained below, outside an engine-failure situation EFS, and as a result of applying the AEO rating:

in the prior art as shown in FIG. 1, the information displayed by the screen 16 is the value of the authorized margin Ma; whereas in the invention as shown in FIG. 2, the information displayed by the screen 16 is the value of a limited margin Ml that is equal to the value of the authorized margin Ma minus a safety margin Ms as identified by a computer.

Furthermore, in diagrams (b) and (d), the main rotor is driven at a speed of rotation, referred to as the NR speed, which is variable and which is controlled by a flight control unit, e.g. by way of example for limiting the sound nuisance from the rotorcraft while approaching a landing point.

The NR speed is variable and calculated by the flight control unit in proportion to a predefined nominal speed NRnom for driving the main rotor.

In the implementation shown by diagrams (b) and (d), it is considered that in the situation St1 as mentioned with reference to the diagrams (a) and (c), the NR speed is potentially controlled by the flight control unit to be less than the nominal speed NRnom. The NR speed is then said to be "low", for example it may be an NR speed corresponding to 94% of the nominal speed NRnom.

In such a context in diagrams (a) and (b) of FIG. 1, and in diagrams (c) and (d) of FIG. 2, consideration is given to an engine-failure situation EFS St2, e.g. failure of the second main engine in the implementation shown. In diagrams (a) and (c), in such an engine-failure situation EFS, the mechanical power Pm2 supplied by the second engine drops quickly.

The regulator unit then conventionally applies an OEI rating for regulating the operation of the first main engine so that the first main engine supplies predefined mechanical power Pm1 for a given duration. In this context, the mechanical power P needed by the rotorcraft is supplied by the first main engine that remains operational.

In an engine-failure situation, said authorized margin Ma is adapted and displayed on the screen 16, and in the prior art it is preferably typically displayed as the mechanical power that can be used in compliance with applying the current OEI rating.

Nevertheless, in diagrams (b) and (d), in an engine-failure situation EFS, the NR speed at which the main rotor is driven drops rapidly, with the consequence of causing the rotorcraft to lose height suddenly.

Rapid intervention by the pilot is needed to vary the pitch of the blades of the main rotor in order to stop as quickly as possible the drop in the NR speed in order to re-establish stabilized progress of the rotorcraft under the control of the pilot.

As mentioned above, outside an engine-failure situation EFS, the pilot operates the rotorcraft by making full use of the mechanical power margin of value that is displayed on the screen 16.

In diagram (b) of FIG. 1, which shows the prior art, it can be seen that the pilot making full use of the authorized margin Ma as displayed on the screen prior to the engine-failure situation EFS leads conventionally, in the event of an engine failure situation EFS, to a considerable drop in the NR speed. In this context, the NR speed is close to a minimum NR speed NRmin as regulated by the control unit. Consequently, the pilot may be in an uncomfortable situation for rapidly re-establishing an NR speed that procures stabilized flight for the rotorcraft.

In contrast, in diagram (c) of FIG. 2, which shows the invention, prior to the engine-failure situation EFS, and providing the main rotor is being driven at a low NR speed, account is taken of a predefined mechanical power referred to as the imposed power Pmi.

The value of the imposed mechanical power Pmi is used to define the safety margin Ms by being predefined as less than the value of the mechanical power supplied by the rotorcraft power plant in compliance with applying the current AEO rating. Consequently, the value of the limited margin Ml displayed on the screen 16 is deduced by subtracting the value of the safety margin Ms from the value of the authorized margin Ma.

In this context, a mechanical power reserve is obtained suitable for mitigating a possible mechanical power deficit in the event of an engine failure.

In an engine-failure situation, the drop in the NR speed is limited as a result of reducing the difference between the potentially minimum mechanical power supplied by the power plant outside an engine-failure situation and the maximum mechanical power supplied by the main engine that remains in operation with its power rising in compliance with applying the OEI regulation rating.

As a result, piloting assistance is provided to the pilot in order to facilitate rapidly re-establishing drive of the main rotor at an NR speed in compliance with the NR speed at which the main rotor was being driven before the engine failure, thereby enabling stabilized flight of the rotorcraft to be obtained, as shown in diagram (d) of FIG. 2.

More particularly, in FIG. 4 and in compliance with the provisions of the present invention as described with reference to FIG. 2, there can be seen a screen 16 for displaying the mechanical power margin available to the pilot under the AEO rating for regulating the operation of the main engines of the rotorcraft.

In diagram (e), the main rotor is being driven at a low NR speed, e.g. about 94% of the speed NRnom. Under such circumstances, the limited margin Ml has a value that is less than the authorized margin Ma, the value of the authorized margin Ma having the safety margin Ms subtracted therefrom before being displayed on the screen 16. Naturally, in diagram (e), the authorized margin Ma and the safety margin Ms are mentioned by way of indication but in reality they are not displayed on the screen 16.

In diagram (f), the main rotor is being driven at the speed NRnom, and in diagram (g), the main rotor is being driven at an NR speed referred to as "high", which is greater than the speed NRnom, e.g. about 105% of the speed NRnom. In these two situations, the value of the authorized margin Ma is displayed on the screen 16.

FIG. 3 shows preferred ways of implementing a method in accordance with the present invention. The main rotor 1 of a multi-engined rotorcraft is driven in rotation by a power plant 2 of the rotorcraft, which power plant has two main engines M1 and M2 in the implementation shown.

In conventional manner, a pilot of the rotorcraft regulates variation in the pitch of the blades of the main rotor 1, at least collectively, and possibly also cyclically, in order to change the behavior in flight of the rotorcraft.

Said variation in the pitch of the blades of the main rotor 1 is caused to occur in particular by a human pilot 3 generating manual flight controls 4 by means of at least one manual flight control member 5 that is for being operated by a human. Depending on the equipment of the rotorcraft, such provisions nevertheless do not exclude making use of an autopilot 6 that generates automatic flight controls 7 in order to vary, at least collectively, the pitch of the blades of the main rotor 1.

Furthermore, conditions of using the mechanical power supplied by the main engines M1 and M2 are conventionally controlled by a regulator unit 10 that, as described above, applies AEO ratings or OEI ratings depending on the operating state of the main engines M1 and M2. The operation of the main engines M1 and M2 is regulated by the regulator unit 10 depending on a flight setpoint CNr, referred to as the NR setpoint, as generated by a flight control unit 8, for driving the main rotor 1 at a desired NR speed.

Furthermore, on-board instrumentation 11 of the rotorcraft commonly generates various items of data 12, 13, 14 that identify the flight conditions of the rotorcraft. Such data 12, 13, 14 may comprise in particular at least atmospheric data 12 relating to the atmospheric conditions surrounding the rotorcraft, flight data 13 relating to the flight situation of the rotorcraft, and/or data 14 relating to the state of operation of the main engines M1 and M2 of the power plant 2 as identified at least in accordance with predefined limit criteria.

The data 12, 13, 14 supplied by the on-board instrumentation 11 is used in particular by the flight control unit 8 to control variation in the NR speed and/or by the regulator unit 10 to control the operating rating of the main engines M1 and M2, and consequently to apply the AEO or OEI rating for regulating the operation of the main engines M1 and M2 as appropriate to the flight situation of the rotorcraft.

Furthermore, the rotorcraft is also provided in conventional manner with a display unit 15 that includes at least one screen 16 for displaying information about the authorized margin Ma of the mechanical power that can be supplied by the power plant 2, which authorized margin is available for use as a function of the current AEO or OEI rating being applied by the regulator unit 10 for regulating the main engines M1 and M2. Said authorized margin Ma is commonly identified by calculation means 9.

Such calculation means 9 are potentially incorporated in a computer 17 used to implement the method of the present invention. In a preferred implementation, as shown, the computer 17 incorporates the calculation means 9. And preferably, the computer 17, the flight control unit 8, and possibly also, where appropriate, the autopilot 6, are all incorporated in a common calculation unit 18.

Regulation data relating to the applied AEO rating is transmitted to the computer 17 by the regulator unit 10. The computer 17 then identifies the mechanical power margin that is to be displayed by the screen 16 on the basis of the authorized margin Ma identified by the calculation means 9 in application of the current AEO or OEI rating being applied by the regulator unit 10.

Furthermore, information about the current NR speed is transmitted to the computer 17.

The information relating to the current NR speed transmitted to the computer 17 may for example be the setpoint CNr generated by the flight control unit 8 and/or information supplied by the on-board instrumentation 11 about a measurement, e.g. a measurement made at the outlet from a main mechanical power transmission gearbox that is used for driving the main rotor 1, or indeed, by way of example, a measurement of the resisting torque opposed by the main rotor 1 against being driven by the power plant 2.

As mentioned above, providing the NR speed is equal to or greater than the nominal speed NRnom, it is the authorized margin Ma that is displayed by the screen 16, regardless of whether or not the situation is an engine-failure situation. Outside an engine-failure situation and at least providing the main rotor 1 is being driving at a low NR speed, the computer 17 identifies the limited margin Ml for display by the screen 16.

For this purpose, the computer 17 compares the current NR speed with a predefined threshold, referred to as the NR speed threshold. The value of the NR speed threshold S is predefined to be no greater than the value of said nominal speed NRnom as defined beforehand minus a small amount. The notion of "minus a small amount" should be understood as defining a value for the NR speed threshold S that is close to, but less than, the nominal speed NRnom. Nevertheless, by way of indication, a reasonable reduction in the value of the nominal speed NRnom for the purpose of defining the NR speed threshold S may lie in the range 2% to 5% of the value of the nominal speed NRnom.

As a result of the comparisons performed by the computer 17 between the current NR speed and the NR speed threshold S, the computer 17 defines the limited margin Ml by applying the rule for reducing the authorized margin Ma by means of the safety margin Ms.

The computer 17 then transmits the value of the limited margin Ml to the display unit 15, thereby causing it to be displayed on the screen 16.

In addition, when the rotorcraft has an autopilot, the computer 17 transmits the limited margin Ml to the autopilot 6. When an autopilot 6 is in operation outside an engine-failure situation, and providing that the main rotor 1 is being driven at a low NR speed, the automatic flight control signals 7 generated by the autopilot 6 for the purpose at least of varying the collective pitch of the blades of the main rotor 1 then take account of the limited margin Ml as identified by the computer 17, and not of the authorized margin Ma.

What is claimed is:

1. A method of assisting the piloting of a multi-engined rotorcraft in the event of a failure of one of the main engines of a power plant of the rotorcraft, referred to as an engine-failure situation, the power plant delivering the mechanical power needed at least for driving rotation of at least one main rotor of the rotorcraft providing the rotorcraft at least with lift, the main rotor, outside an engine-failure situation, being driven by the power plant in compliance with applying a speed setpoint, referred to as the NR setpoint, of variable value that is calculated by a flight control unit depending on the current flight conditions of the rotorcraft so as to lie in a range of NR setpoint values that are proportional to the value of a predefined nominal speed for driving the main rotor, the flight control unit supplying the NR setpoint to a regulator unit for regulating the individual operation of each of the main engines for driving the main rotor at a speed, referred to as the NR speed, in compliance with applying the NR setpoint, the regulator unit applying various regulation ratings to the individual operation of each of the main engines depending on the current flight state of the rotorcraft, including:

in a current flight state of the rotorcraft that is outside an engine-failure situation, first regulation ratings, referred to as AEO ratings, defining a maximum authorized rating for each of the main engines for respective predefined durations at each of the AEO ratings;

in a current flight state of the rotorcraft that is an engine-failure situation, second regulation ratings, referred to as OEI ratings, defining a contingency rating authorized for at least one of the main engines remaining operational for respective predefined durations corresponding to each of the OEI ratings; and the rotorcraft being fitted with a unit, referred to as a display unit, using a display screen for displaying at least one value relating to the mechanical power margin that is authorized for use by the pilot, referred to as the authorized margin, which value is deduced by calculation means depending on at least the current regulation rating of the main engines while taking account at least of limit criteria identifying the operating states of the main engines;

wherein, outside an engine-failure situation, the value displayed by the screen relating to the authorized margin, then referred to as the limited margin, is the value of the authorized margin after a predefined value, referred to as the safety margin, has been subtracted therefrom by a computer, on condition at least of driving the main rotor at an NR speed, referred to as "low" speed, under the control of the flight control unit and identified as being below a predefined speed threshold for driving the main rotor, referred to as the NR speed threshold, such that in an engine-failure situation and in the event that, prior to the engine-failure situation, the rotorcraft was operating at a drive NR speed for the main rotor below the NR speed threshold, the pilot of the rotorcraft has a mechanical power reserve making it easier for the pilot to take action on the behavior of the rotorcraft in order to re-establish control quickly over its progress, while avoiding any significant drop in the number of revolutions per second in the rotation of the main rotor.

2. A method according to claim 1, wherein the reduction of the authorized margin by the safety margin, as performed outside an engine-failure situation by the computer prior to displaying the value of the limited margin on the screen, is conditional on the main engines being regulated specifically in an MCP mode defining a maximum authorized continuous rating for the main engines.

3. A method according to claim 1, wherein the value of the NR speed threshold corresponds at most to a little less than the value of the predefined nominal speed for driving the main rotor.

4. A method according to claim 3, wherein the value of the NR speed threshold corresponds at most to the value of the predefined nominal speed for driving the main rotor minus a value lying in the range 2% to 5% of the nominal speed.

5. A method according to claim 1, wherein the value of the safety margin is predefined proportionally to the mechanical power limit authorized by the current AEO rating.

6. A method according to claim 5, wherein the value of the safety margin is predefined in proportion to the mechanical power limit authorized by the current AEO rating, the proportion lying in the range 8% to 25%.

7. A method according to claim 1, wherein the value of the safety margin (Ms) is predefined to be variable as a function of the current NR speed.

8. A method according to claim 1, wherein the method comprises the following operations outside an engine-failure situation:

generating the NR setpoint by means of the flight control unit and transmitting the generated NR setpoint to the regulator unit;

outside an engine-failure situation, the regulator unit applying an AEO rating depending on the stage of flight of the rotorcraft;

the computer having transmitted thereto firstly the current AEO rating by the regulator unit applying the AEO rating, and secondly the operating state of the main engines as identified as a function of the values of the limit criteria from the on-board instrumentation of the rotorcraft; and then the computer identifying firstly the value of the authorized margin as a result of applying the current AEO rating, and secondly the safety margin, and then the computer deducing the value of the limited margin and the computer transmitting the value of the limited margin to the display unit, causing the value to be displayed on the screen; and the pilot of the rotorcraft generating flight controls in compliance with using the mechanical power supplied by the power plant and in accordance with the value of the limit margin as deduced by the computer.

9. A method according to claim 1, wherein the position of a human-driven manual flight control member operated by a human pilot to vary the pitch of the blades of the main rotor is servo-controlled by the flight control unit in compliance with the value of the limited margin.

10. A method according to claim 9, wherein the manual flight control member is fitted with a generator of haptic signals that vary at least depending on variation in the value of the limited margin.

11. A method according to claim 1, wherein the rotorcraft has an autopilot, and outside an engine-failure situation, automatic flight controls are generated by the autopilot, when it is in operation, by taking account of the limited margin, and providing the main rotor is being driven at a low NR speed.

12. A power plant of a multi-engined rotorcraft, the power plant including main engines and providing assistance in piloting a multi-engined rotorcraft in an engine-failure situation as a result of one of the main engines of a power plant of the rotorcraft failing, the power plant delivering mechanical power needed at least for driving rotation of at least one main rotor of the rotorcraft providing the rotorcraft at least with lift, the main rotor, outside an engine-failure situation, being driven by the power plant in compliance with applying a speed setpoint, referred to as the NR setpoint, of variable value that is calculated by a flight control unit depending on the current flight conditions of the rotorcraft so as to lie in a range of NR setpoint values that are proportional to the value of a predefined nominal speed for driving the main rotor, the flight control unit supplying the NR setpoint to a regulator unit for regulating the individual operation of the main engines for driving the main rotor at a speed, referred to as the NR speed, in compliance with applying the NR setpoint, the regulator unit applying various regulation ratings to the individual operation of each of the main engines depending on the current flight state of the rotorcraft, including:

in a current flight state of the rotorcraft that is outside an engine-failure situation, first regulation ratings, referred to as AEO ratings, defining a maximum authorized rating for each of the main engines for respective predefined durations at each of the AEO ratings;

in a current flight state of the rotorcraft that is in an engine-failure situation, second regulation ratings, referred to as OEI ratings, defining a contingency rating authorized for at least one of the main engines remaining operational for respective predefined durations corresponding to each of the OEI ratings; and the rotorcraft being fitted with a unit, referred to as a display unit, using a display screen for displaying at least one value relating to the mechanical power margin that is authorized for use by the pilot, referred to as the authorized margin, which value is deduced by calculation means depending on at least the current regulation rating of the main engines while taking account at least of limit criteria identifying the operating states of the main engines;

wherein, outside an engine-failure situation, the value displayed by the screen relating to the authorized margin, then referred to as the limited margin, is the value of the authorized margin after a predefined value, referred to as the safety margin, has been subtracted therefrom by computer, on condition at least of driving the main rotor at an NR speed, referred to as "low" speed, under the control of the flight control unit and identified as being below a predefined speed threshold for driving the main rotor, referred to as the NR speed threshold, such that in an engine-failure situation and in the event that, prior to the engine-failure situation, the rotorcraft was operating at a drive NR speed for the main rotor that is below the NR speed threshold, the pilot of the rotorcraft has a mechanical power reserve making it easier for the pilot to take action on the behavior of the rotorcraft in order to re-establish control quickly over its progress, while avoiding any significant drop in the number of revolutions per second in the rotation of the main rotor.

13. A multi-engined rotorcraft having a power plant with main engines; the multi-engined rotorcraft providing assistance in piloting a multi-engined rotorcraft in an engine-failure situation as a result of one of the main engines of a power plant of the rotorcraft failing, the power plant delivering the mechanical power needed at least for driving rotation of at least one main rotor of the rotorcraft providing the rotorcraft at least with lift, the main rotor, outside an engine-failure situation, being driven by the power plant in compliance with applying a speed setpoint, referred to as the NR setpoint, of variable value that is calculated by a flight control unit depending on the current flight conditions of the rotorcraft so as to lie in a range of NR setpoint values that are proportional to the value of a predefined nominal speed (NRnom) for driving the main rotor, the flight control unit supplying the NR setpoint to a regulator unit for regulating the individual operation of the main engines for driving the main rotor at a speed, referred to as the NR speed, in compliance with applying the NR setpoint, the regulator unit applying various regulation ratings to the individual operation of each of the main engines depending on the current flight state of the rotorcraft, including:

in a current flight state of the rotorcraft that is outside an engine-failure situation, first regulation ratings, referred to as AEO ratings, defining a maximum authorized rating for each of the main engines for respective predefined durations at each of the AEO ratings;

in a current flight state of the rotorcraft that is in an engine-failure situation, second regulation ratings, referred to as OEI ratings, defining a contingency rating authorized for at least one of the main engines remaining operational for respective predefined durations corresponding to each of the OEI ratings; and the rotorcraft being fitted with a unit, referred to as a display unit, using a display screen for displaying at least one value relating to the mechanical power margin that is authorized for use by the pilot, referred to as the authorized margin, which value is deduced by calculation means depending on at least the current regulation rating of the main engines while taking account at least of limit criteria identifying the operating states of the main engines;

wherein, outside an engine-failure situation, the value displayed by the screen relating to the authorized margin, then referred to as the limited margin, is the value of the authorized margin after a predefined value, referred to as the safety margin, has been subtracted therefrom by computer, on condition at least of driving the main rotor at an NR speed, referred to as "low" speed, under the control of the flight control unit and identified as being below a predefined speed threshold for driving the main rotor, referred to as the NR speed threshold, such that in an engine-failure situation and in the event that the rotorcraft was operating prior to the engine-failure situation, at a drive NR speed for the main rotor below the NR speed threshold, the pilot of the rotorcraft has a mechanical power reserve making it easier for the pilot to take action on the behavior of the rotorcraft in order to re-establish control quickly over its progress, while avoiding any significant drop in the number of revolutions per second in the rotation of the main rotor.

* * * * *